United States Patent
Hsu

(10) Patent No.: US 6,763,824 B1
(45) Date of Patent: Jul. 20, 2004

(54) FAR INFRARED BARBECUE STOVE

(76) Inventor: Sen Kung Hsu, P.O. Box 82-144, Taipei (TW)

(*) Notice: Subject to any disclaimer, the term of this patent is extended or adjusted under 35 U.S.C. 154(b) by 0 days.

(21) Appl. No.: 10/428,770

(22) Filed: May 5, 2003

(51) Int. Cl.⁷ .................................. F24C 3/00
(52) U.S. Cl. ............... 126/41 R; 126/39 J; 126/92 AC
(58) Field of Search .............. 126/39 J, 41 R, 126/92 AC, 92 C; 431/326

(56) References Cited

U.S. PATENT DOCUMENTS

| | | | |
|---|---|---|---|
| 3,870,031 A | * 3/1975 | Kruper | 126/39 J |
| 4,728,777 A | * 3/1988 | Tsisios et al. | 392/418 |
| 4,886,044 A | * 12/1989 | Best | 126/39 C |
| 5,368,009 A | * 11/1994 | Jones | 126/41 R |
| 5,676,048 A | * 10/1997 | Schroeter et al. | 99/385 |
| 5,755,154 A | * 5/1998 | Schroeter et al. | 99/401 |
| 5,761,990 A | * 6/1998 | Stewart, deceased et al. | 99/401 |

FOREIGN PATENT DOCUMENTS

EP         0 442 766 A1 * 8/1991

* cited by examiner

Primary Examiner—Alfred Basichas
(74) Attorney, Agent, or Firm—Leong C. Lei

(57) ABSTRACT

A far infrared barbecue stove structure is disclosed. The stove comprises a stove body, at least a gas burner, at least an infrared ceramic radiation plate, and a plurality of high temperature resistance ceramics rods which can be mounted on an opening cavity on the top side of the stove body. Foodstuff is heated without contamination.

5 Claims, 3 Drawing Sheets

FAR INFRARED BARBECUE STOVE

BACKGROUND OF THE INVENTION (a) Technical Field of the Invention

The present invention relates to a stove used for barbecuing foodstuff, and in particular, a stove structure with far infrared radiation device to grill foodstuff without contaminating foodstuff and at the same time the stove is not polluted.

(b) Description of the Prior Art

Conventional barbecue stove essentially has a stove body which can hold burning material (such as wood, charcoal and gas) and other related device (such as gas buner). The top side of the stove body is an opening mounted with a metal or stainless steel wire mesh. The fuels within the stove body generates heat to heat up the metal mesh. However, the drawbacks of the conventional barbecue stove are as follows:

(1) there is no isolation for foodstuff and the fuels. Thus, the foodstuff is directly heated and this causes dehydration of foodstuff and unevenly heating to foodstuff. In this case, the foodstuff may be not properly heated or the taste of the foodstuff cannot be retained.

(2) the mesh is oxidized after a period of time and this will contaminate the foodstuff while barbecuing. Due to the contamination of the mesh, the mesh has to be replaced often and thereof it is not economical.

(3) the sources applied to the foodstuff will contact with the stove body. This will pollute the stove body and damage the stove body.

Accordingly it is an object of the present invention to provide a far infrared barbecue stove which heats up foodstuff without contamination the foodstuff.

SUMMARY OF THE INVENTION

Accordingly, it is an object of the present invention to provide a far infra-red barbecue stove structure comprising a stove body having a top side with an open cavity and having a lateral side being a plurality of switching buttons for controlling the flow rate of fuels and for connection to an ignition device; at least a gas burner mounted within the cavity and controlled by the switching button, the front and rear ends of the gas burner being provided with an upright side branch plate having mounted at the side thereof with a recessed arch-shaped hook, the inner side of the hook being a horizontally extended support section; at least an infra-red ceramic radiating plate being an arch-shaped structure, and the top side thereof being a top arch-shaped face, the inner side being a plurality of wavelike faces such that the infra-red ceramic radiation plate is located between the two branch plates, and the two lateral sides of the radiation plate located on the support section and the hook being used for positioning the radiation plate and the radiation plate is formed into a covering plate, the heat energy from the infra-red radiation being converted into far infra-red heat energy, the inner layer of the radiation plate. being a plurality of wave-like faces so as to increase heat energy absorption surface and the hot air of the gas burner is retained within the recess for re-heating to increase burning efficiency; and a plurality of high temperature ceramic rods which can be mounted on the opening at the top side for holding food stuff, whereby the uniform for infra-red heat energy from the radiation plate will heat up food stuff.

Yet another object of the present invention is to provide a far infrared barbecue stove structure, wherein the center of the top side of the branch plate is extended correspondingly to form an engaging element to hold the top arch-shaped face of the radiation plate for mounting.

Still another object of the present invention is to provide a far infrared barbecue stove structure, wherein the two corresponding sides at the opening of the top side of the cavity are provided with two positioning frames to hold a plurality of high temperature resistance rods which are mounted in parallel.

Another object of the present invention is to provide a far infra-red barbecue stove, wherein one side of the positioning frame is provided with a plurality of insertion holes for the insertion of the high temperature resistance ceramic rod at one end, and the positioning frame is provided with a plurality of recesses spaced equally for the insertion of the other end of the high temperature resistance ceramic rod.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
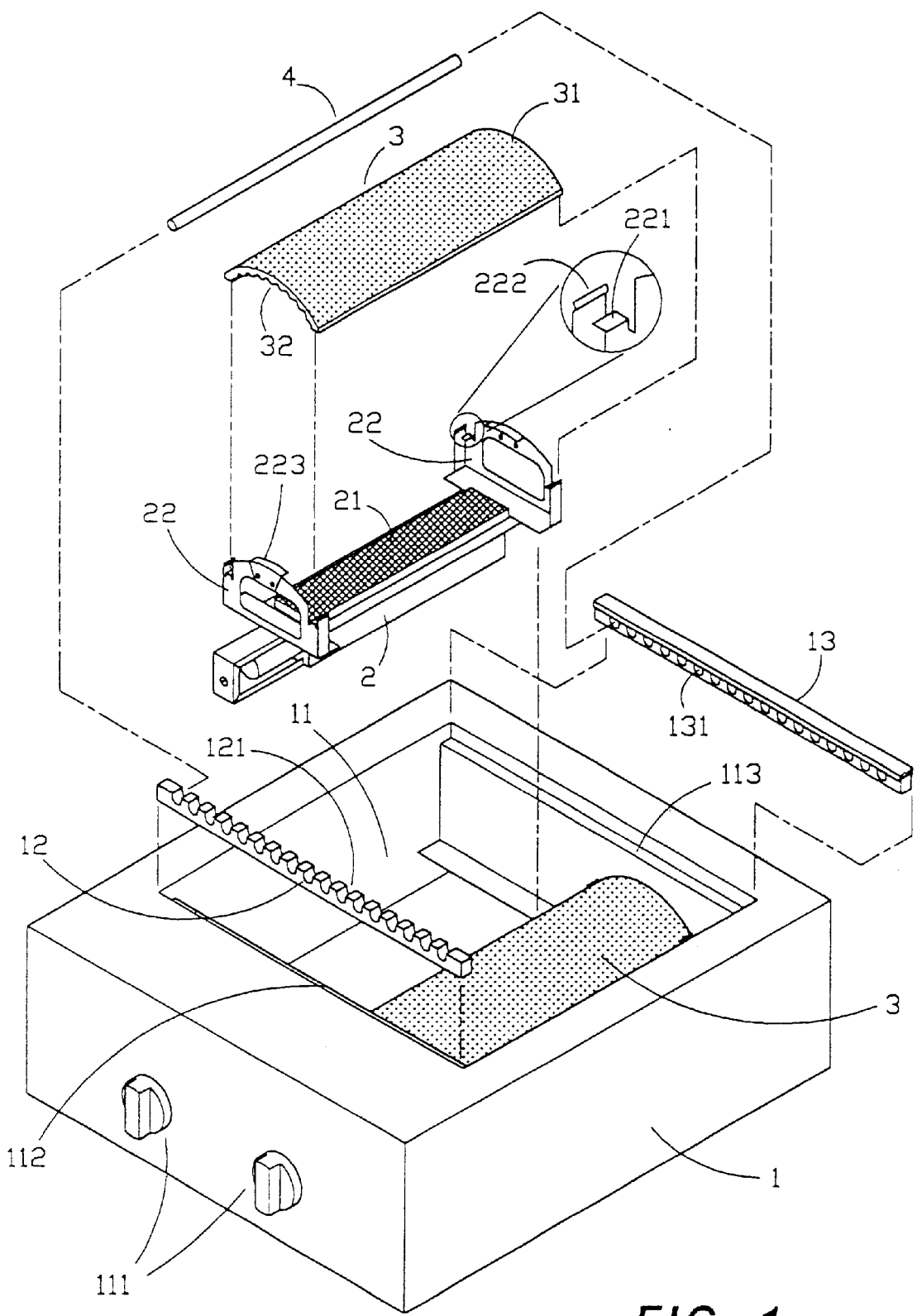
FIG. 1 is an exploded view of the far infrared barbecue stove structure of the present invention.

Referring to FIG. 1, there is shown a perspective exploded view of the far infra-red barbecue stove structure comprising a stove body 1, a gas burner 2, a far infra-red ceramic radiation plate 3 and a high temperature resistance ceramic rod 4, wherein the stove body 1 has a top side with an open cavity 11 and has a lateral side being a plurality of switching buttons 111 for controlling the flowrate of fuels and for connection to an ignition device. The two corresponding sides of the opening at the top side are provided with recesses 112, 113 for the mounting of positioning supports 12, 13. There are recesses 121 at the lateral side of the positioning support 13 and a plurality of spaced apart insertion holes 131 are provided at the corresponding side of the positioning support 13.

The gas burner 2 is mounted within the cavity 11 and the burner 2 is provided with beehive shaped infra-red ceramic plate 21 and at the front and rear side of the plate 21 are provided with upright with an upright side branch plate 22 having mounted at the side thereof with a recessed arch-shaped hook 222. The gas buner 2 is controlled by the switching button 111. The inner side of the hook 222 is a horizontally extended support section 221.

In accordance with the present invention, the far infrared ceramic radiating plate 3 is an arch-shaped structure, and the top side thereof is a top arch-shaped face 31, and the inner side is a plurality of wavelike faces 32 such that the high temperature resistance infrared ceramic radiation plate is located between the two branch plates 22. The two lateral sides of the radiation plate 3 are located on the support section 221 and the hook 222 is used for positioning the radiation plate 3 and the radiation plate 3 is formed into a covering plate. The heat energy from the far infrared radiation plate 3 is converted into far infrared heat energy. The inner layer of the radiation plate 3 is a plurality of wave-like faces 32 so as to increase heat energy absorption surface and the hot air of the gas buner 2 is retained within the recess 121 for re-heating to increase burning efficiency.

A plurality of high temperature ceramic rods 4 is mounted on the opening at the top side for holding foodstuff. In the present invention, a metal rod is used as high temperature resistance ceramic rod 4 and the external layer of the rod 4 is coated with a layer of enamel.

Figure 2:
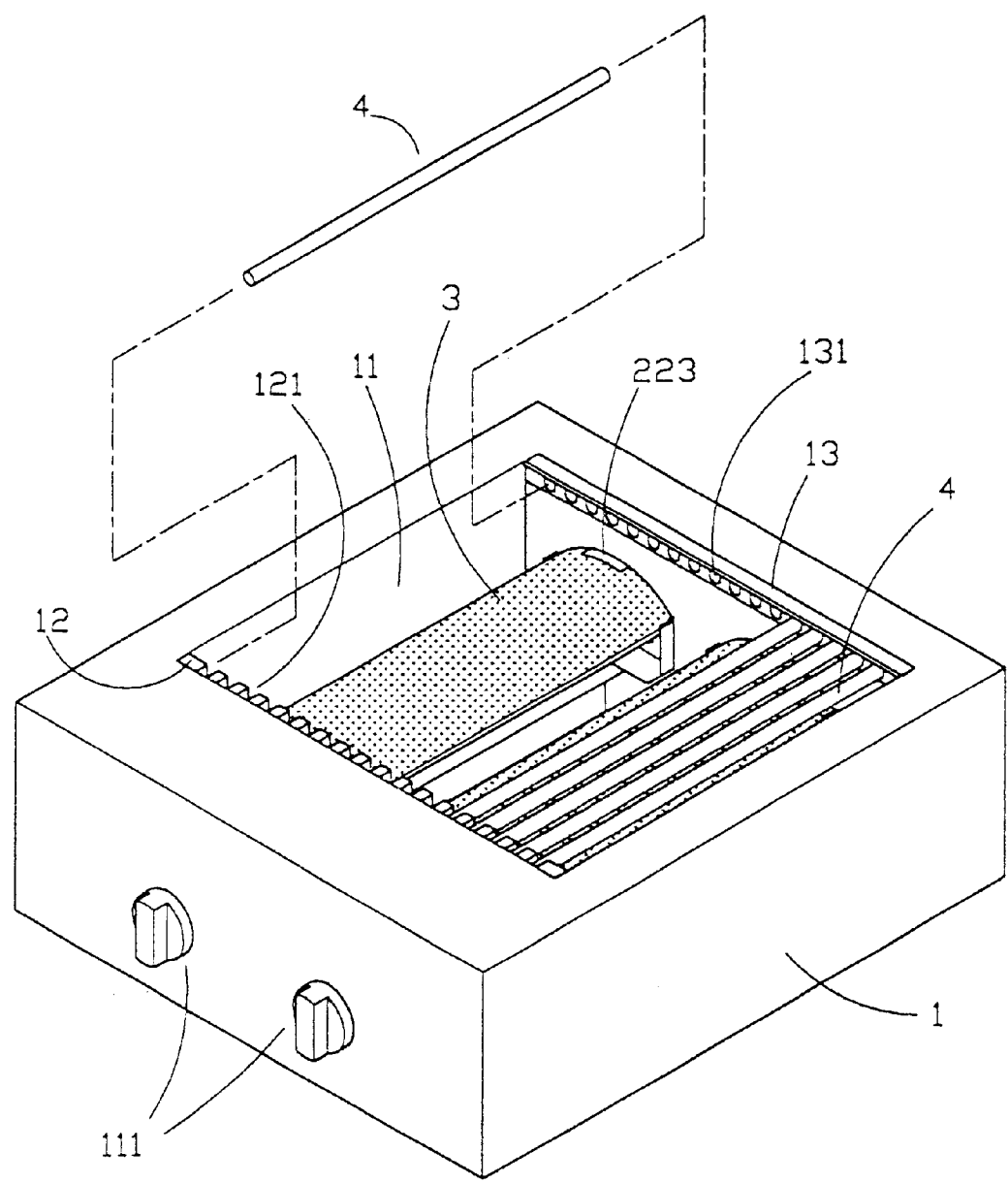
FIG. 2 is a partial perspective view of the far infrared barbecue stove structure of the present invention.
Figure 3:
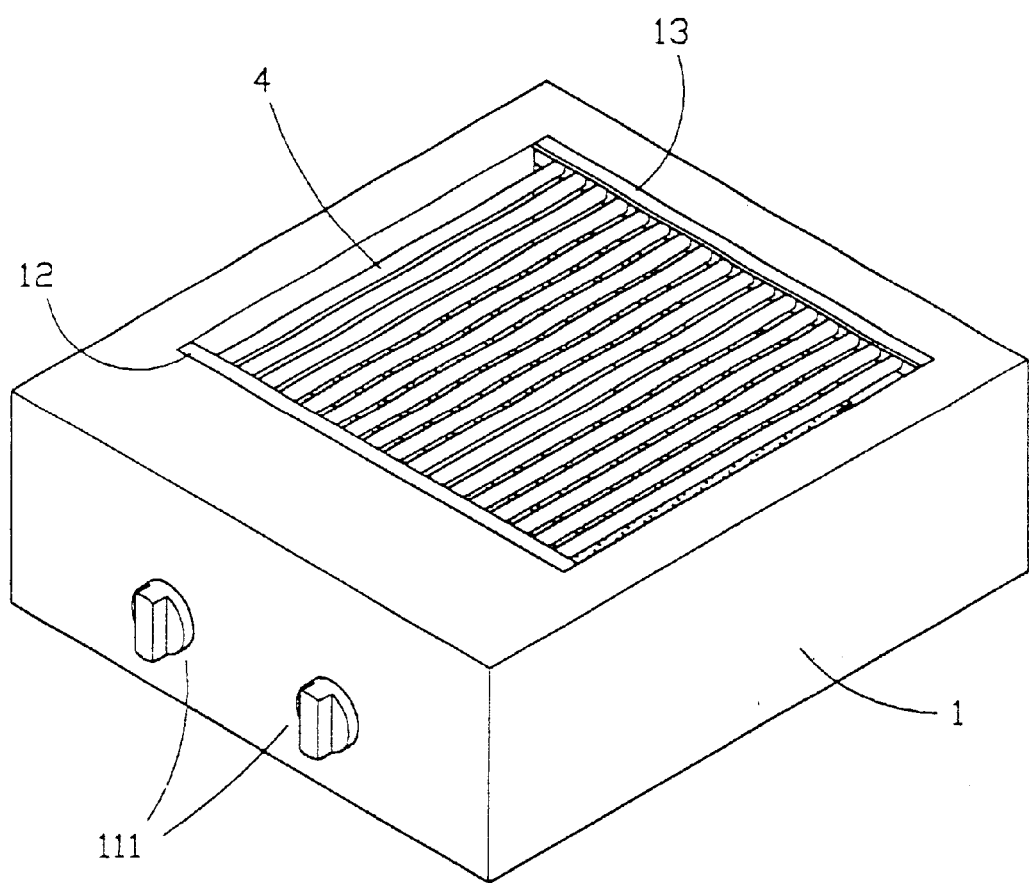
FIG. 3 is a perspective view of the far infrared barbecue stove structure of the present invention.

Referring to FIGS. 2 and 3, in combination, the gas burner 2 is positioned at the cavity 11 of the stove body 1 and the far infra-red ceramic radiation plate 3 is positioned between two side branch plates 22 of the gas burner 2, and the two sides of the radiation plate 3 are positioned at the support 221 of the side branch plate 22 and the arch-shaped hook 222 is used to engage the two external sides of the far infra-red ceramic radiation plate 3. An-engaging. element 223 is used to hook the top arch-shaped face 3 of the radiation plate 3 for positioning. Next, one after the other one, the high temperature resistance ceramic rods 4 are positioned between two positioning supports 12, 13 by first inserting one end of the rod 4 into the insertion hole or the support 1 and the other end is mounted to the recess 121 of the positioning support 12.

When in use, the foodstuff is placed on the high temperature ceramic rod 4 and the foodstuff is isolated from the fuels. This will avoid incomplete combination fuel to contaminate the foodstuff. The infrared energy generated from the gas burner 2 is converted to far-infrared radiation heat energy which can heat up foodstuff without loosing of water contents of the foodstuff.

It will be understood that each of the elements described above, or two or more together may also find a usefull application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An infra-red barbecue stove structure comprising:
    (a) a stove body having a top side with an open cavity and having a lateral side being a plurality of switching buttons for controlling the flowrate of fuels and for connection to an ignition device;
    (b) at least a gas burner mounted within the cavity and controlled by the switching button, the front and rear ends of the gas burner being provided with an upright side branch plate having mounted at the side thereof with a recessed arch-shaped hook, the inner side of the hook being a horizontally extended support section;
    (c) at least an infra-red ceramic radiating plate being an arch-shaped structure, and the top side thereof being a top arch-shaped face, the inner side being a plurality of wavelike faces such that the infra-red ceramic radiation plate is located between the two branch plates, and the two lateral sides of the radiation plate located on the support section and the hook being used for positioning the radiation plate and the radiation plate is formed into a covering plate, the heat energy from the infra-red radiation being converted into far infra-red heat energy, the inner layer of the radiation plate being a plurality of wave-like faces so as to increase heat energy absorption surface and the hot air of the gas burner is retained within the recess for re-heating to increase burning efficiency; and
    (d) a plurality of high temperature ceramic rods which can be mounted on the opening at the top side for holding food stuff,
    whereby the uniform infra-red heat energy from the radiation plate will heat up food stuff.

2. The infrared barbecue stove of claim 1, wherein the center of the top side of the branch plate is extended correspondingly to form an engaging element to hold the top arch-shaped face of the radiation plate for mounting.

3. The infrared barbecue stove of claim 2, wherein the two corresponding sides at the opening of the top side of the cavity are provided with two positioning frames to hold a plurality of high temperature resistance rods which are mounted in parallel.

4. The infra-red barbecue stove of claim 3, wherein one side of the positioning frame is provided with a plurality of insertion holes for the insertion of the high temperature resistance ceramic rod at one end, and the positioning frame is provided with a plurality of recesses spaced equally for the insertion of the other end of the high temperature resistance ceramic rod.

5. The infrared barbecue stove of claim 1, wherein the high temperature resistance ceramic rod is a metal rod covered with an enamel layer.

* * * * *